(12) United States Patent
Kohn

(10) Patent No.: US 8,307,707 B2
(45) Date of Patent: Nov. 13, 2012

(54) METHOD FOR OPERATING A SENSOR SYSTEM, AND SENSOR SYSTEM

(75) Inventor: Oliver Kohn, Reutlingen (DE)

(73) Assignee: Robert Bosch GmbH, Stuttgart (DE)

( * ) Notice: Subject to any disclaimer, the term of this patent is extended or adjusted under 35 U.S.C. 154(b) by 600 days.

(21) Appl. No.: 12/589,203

(22) Filed: Oct. 19, 2009

(65) Prior Publication Data

US 2010/0101323 A1    Apr. 29, 2010

(30) Foreign Application Priority Data

Oct. 29, 2008   (DE) .......................... 10 2008 043 256

(51) Int. Cl.
*G01C 23/00*   (2006.01)
*G01C 19/56*   (2012.01)
(52) U.S. Cl. ..................... 73/510; 73/504.12; 73/514.02
(58) Field of Classification Search ............... 73/504.12, 73/510, 514.02, 514.04
See application file for complete search history.

(56) References Cited

U.S. PATENT DOCUMENTS

| 6,520,017 B1 * | 2/2003 | Schoefthaler et al. ..... 73/514.02 |
| 6,553,833 B1 * | 4/2003 | Funk et al. ................. 73/504.14 |

FOREIGN PATENT DOCUMENTS

DE   199 15 257   6/2000

* cited by examiner

*Primary Examiner* — John Chapman, Jr.
(74) *Attorney, Agent, or Firm* — Kenyon & Kenyon LLP

(57) ABSTRACT

In a method for operating a sensor system including a substrate having a main plane of extension and an oscillating structure which is movable relative to the substrate, drive elements excite the oscillating structure to a torsional oscillation about an axis of oscillation running essentially perpendicular to the main plane of extension, first detection elements detect a first tilting movement of the oscillating structure about a first tilting axis essentially parallel to the main plane of extension, and further detection elements detect an angular acceleration of the substrate superposed to the torsional oscillation essentially about the axis of oscillation.

10 Claims, 1 Drawing Sheet

METHOD FOR OPERATING A SENSOR SYSTEM, AND SENSOR SYSTEM

BACKGROUND OF THE INVENTION

1. Field of the Invention

The present invention relates to a method for operating a rotation-rate sensor system.

2. Description of Related Art

Such methods are generally known, e.g., published German patent publication DE 199 15 257 A1 discloses a Coriolis rotation-rate sensor, which has an oscillating structure, suspended in a rotatable manner on a base element, at which a change in the angular momentum can be brought about by an externally acting rate-of-rotation, and which has a capacitive sensor system by which the tilting movement of the oscillating structure caused by the change in the angular momentum can be detected, the capacitive sensor system being formed by a plurality of capacitances, the particular electrodes of the capacitances lying opposite on a periphery of the oscillating structure acting as the other electrodes, in such a way that tilting movements of the oscillating structure in a plurality of directions of the tilting movements can be detected in a capacitive manner. This makes it possible to measure changes in the angular momentum about axes of rotation that are aligned parallel to a main plane of extension of the base element. A measurement of rotation rates perpendicular to the main plane of extension is not provided.

BRIEF SUMMARY OF THE INVENTION

In contrast to the related art, the method according to the present invention for operating a sensor system has the advantage that the use of the sensor system (hereinafter also referred to as rate-of-rotation sensor) not only allows the detection of a rotation rate about an axis of rotation parallel to the main plane of extension as a result of a Coriolis force acting on the oscillating structure, but simultaneously enables a determination of an angular acceleration of the oscillating structure about the axis of oscillation with the aid of the third detection means. This is accomplished in that the third detection means evaluate the movement of the oscillating structure about the axis of oscillation relative to the substrate and thereby detect an acceleration of the oscillating structure about the axis of oscillation, which is superposed to the torsional oscillation driven by the drive elements and produced by the mass inertia of the oscillating structure in an external angular acceleration of the entire sensor structure, i.e., substrate and oscillating structure, about the axis of rotation. Many application sectors for rate-of-rotation sensors require two-channel measurements, i.e., measurements of two rotary motions that are aligned essentially perpendicular to one another. In addition to measuring the tilting movement about a tilting axis in the main plane of extension, the method for operating a rate-of-rotation sensor according to the present invention advantageously allows the measuring of rotary motions having an axis of rotation running perpendicular to the main plane of extension, in this way enabling in an especially advantageous manner a two-channel measurement of angular accelerations about random axes of rotation using the one rate-of-rotation sensor. As a result, the alignment of the rate-of-rotation sensor is freely selectable during use or installation of the rate-of-rotation sensor. This has the advantage that the rate-of-rotation sensor is more optimally adaptable to specific installation conditions, because the installation position or the installation alignment of the rate-of-rotation sensor need not be adapted to the sensitive axes of the rate-of-rotation sensor. Therefore, the production and installation costs are able to be reduced considerably. It is preferred if the oscillating structure is suspended on the substrate by spring elements in a springy manner or suspended in a manner allowing movement relative to the substrate. The main plane of extension within the meaning of the present invention is aligned essentially parallel to the X/Y plane, while the axis of oscillation runs perpendicular to the main plane of extension, essentially parallel to the Z-axis.

According to one further example development, the third detection elements detect a change in capacitance between a detection electrode on the substrate and a counter-detection electrode on the oscillating structure. Preferably, the angular acceleration superposed to the torsional oscillation is detected by the change in capacitance between the detection electrode and the counter-detection electrode, which are independent of the drive electrodes. The angular acceleration results particularly from a change in capacitance, measured by the third detection means, which deviates from an essentially periodic capacitance change between detection electrode and counter-detection electrode caused by the incited torsional oscillation because the periodical capacitance change caused by the incited torsional oscillation is measurable by the third detection means also in the absence of an angular acceleration superposed to the torsional oscillation.

According to an additional further example development, the torsional oscillation is generated in a capacitive manner with the aid of the drive elements, which include drive electrodes on the substrate and corresponding counter-drive electrodes on the oscillating structure, drive voltages preferably being applied between the drive electrodes and the counter-drive electrodes. The drive electrodes and the counter-drive electrodes in particular include an electrostatic comb drive, and an action of force between the drive electrodes and the corresponding counter-drive electrodes is generated by a drive voltage between the drive electrodes and counter-drive electrode, and the capacitance between drive electrodes and counter-drive electrodes vary as a function of the deflection between drive electrodes and counter-drive electrodes.

According to another further example refinement, the drive voltages are evaluated with the aid of the third detection elements. An angular acceleration of the oscillating structure superposed to the torsional oscillation is detectable in an especially advantageous manner by evaluating the drive voltages at the drive elements, so that, apart from third detection elements for evaluating the drive voltages, no additional detection elements are required in the region of the oscillating structure. The effects of an angular acceleration superposed to the torsional oscillation are realized especially in drive elements in which the drive voltages are controlled by feedback. That means that the torsional oscillation is checked with the aid of additional detection means and is fed back, shifted in phase, to the drive voltage for the purpose of controlling the drive elements at the precise frequency. An angular acceleration superposed to the torsional oscillation is thus quantifiable by evaluating a change in the drive voltage.

According to a further example refinement, the first tilting movement is detected in capacitive manner with the aid of the first detection elements, the first detection elements including first electrodes on the substrate and corresponding first counter electrodes on the oscillating structure, and preferably a first change in capacitance between the first electrode and the first counter electrode being detected. Because of the torsional oscillation of the oscillating structure with an axis of oscillation running perpendicular to the main plane of extension, a first Coriolis force is acting on the oscillating structure, essentially parallel to the axis of oscillation, in response to the occurrence of a first rate-of rotation about a first axis of rotation at the sensor system, the first Coriolis force causing the first tilting movement of the oscillating structure about the first tilting axis, and the first axis of rotation being aligned essentially perpendicular to the first tilting axis and essentially perpendicular to the axis of oscillation, and the first tilting axis furthermore being aligned essentially perpendicular to the axis of oscillation. The tilting movement causes a change in the clearance between the first electrode overlapping perpendicular to the main plane of extension and the first counter electrode, which change is measurable via the corresponding first change in capacitance between the first electrode and the first counter electrode. The first detection elements preferably include at least two pairs of first electrodes and corresponding first counter electrodes, which are positioned in a dynamically balanced manner about the axis of oscillation.

According to a further example refinement, a second tilting movement of the oscillating structure about a second tilting axis running essentially parallel to the main plane of extension and essentially perpendicular to the first tilting axis is detected by second detection elements, the second detection elements preferably including second electrodes on the substrate and corresponding second counter electrodes on the oscillating structure, it being especially preferred if a second change in capacitance is detected between the second electrode and the second counter electrode. In an especially advantageous manner the sensor system is therefore sensitive with respect to rates of rotation that are perpendicular to each other in the main plane of extension, and simultaneously sensitive with respect to an angular acceleration perpendicular to the main plane of extension, so that a three-channel rate-of-rotation sensor is able to be realized in an especially uncomplicated and cost-effective manner, preferably without additional detection elements in the oscillating structure. In particular, the alignment and installation position of the rate-of-rotation sensor is therefore freely selectable. The second detection means are preferably configured analogously to the first detection means, the second detection means being rotated by 90 degrees about the axis of oscillation relative to the first detection means.

Another subject of the present invention is a sensor system having a substrate with a main plane of extension, and an oscillating structure which is movable relative to the substrate, the sensor system including drive elements for generating a torsional oscillation of the oscillating structure about an axis of oscillation running essentially perpendicular to the main plane of extension; furthermore, the sensor system has first detection elements for detecting a first tilting movement of the oscillating structure about a first tilting axis running essentially parallel to the main plane of extension, and the sensor system furthermore has third detection elements for detecting an angular acceleration, superposed to the torsional oscillation, of the oscillating structure, essentially about the axis of rotation. By realizing third detection elements for detecting the angular acceleration, which is superposed to the torsional oscillation, it is possible to implement a rate-of-rotation sensor in an especially simple and cost-effective manner, which sensor detects an angular acceleration of the oscillating structure about the axis of oscillation. As a result, a 3-channel rate-of-rotation sensor is realizable in an especially advantageous manner.

According to one example refinement, the drive elements include drive electrodes on the substrate and corresponding counter-drive electrodes on the oscillating structure, the third detection elements being provided for analyzing drive voltages between the drive electrodes and the counter-drive electrodes. It is especially advantageous that no constructional modifications of the oscillating structure and/or the electrodes of the oscillating structure or the substrate are required. The third detection elements preferably include only an electric circuit or an electronic component for evaluating the drive voltage, so that a relatively cost-effective realization or production of 3-channel rate-of-rotation sensors is made possible.

According to an example refinement, the third detection elements include detection electrodes on the substrate and corresponding counter-detection electrodes on the oscillating structure, so that an angular acceleration superposed to the torsional oscillation is measurable in a simple manner based on the changes in capacitance between the detection electrodes and the counter-detection electrodes. The third detection means are preferably independent of the drive electrodes in this case.

According to one example refinement, the sensor system includes second detection elements for detecting a second tilting movement of the oscillating structure about a second tilting axis running essentially parallel to the main plane of extension and essentially perpendicular to the first tilting axis. Thus, two rates of rotation are able to be measured independently of each other in an especially advantageous manner, both rates-of-rotation running parallel to the main plane of extension and standing essentially perpendicular atop of each other, so that an overall 3-channel rate-of-rotation sensor is realized in a simple manner using only a single oscillating structure.

DETAILED DESCRIPTION OF THE INVENTION

Figure 1:
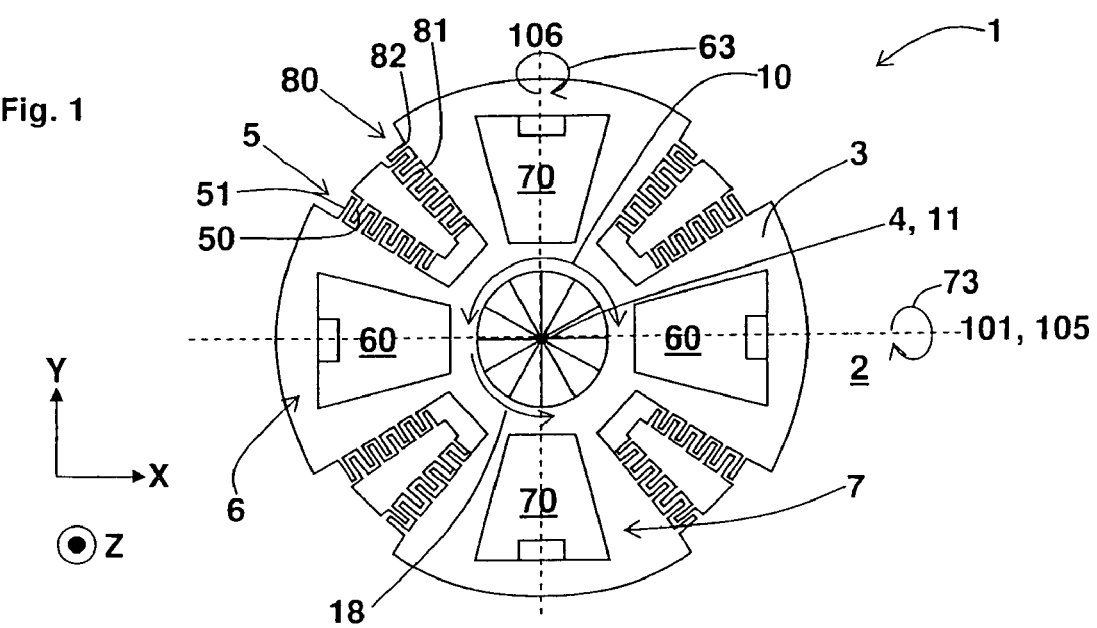
FIG. 1 show a schematic plan view of a sensor system according to an exemplary embodiment of the present invention.

In the following description, identical elements are provided with the same reference numerals in the figures.

FIG. 1 shows a schematic plan view of a sensor system 1 according to an exemplary embodiment of the present invention, sensor system 1 having a substrate 2. Substrate 2 has a main plane of extension 100, which is aligned parallel to the X-/Y-plane. Furthermore, sensor system 1 includes an oscillating structure 3, which is suspended on substrate 2 in a springy manner with the aid of a spring 4 and is able to move relative to substrate 2. With the aid of drive elements 5, in the form of a comb drive 5' having drive electrodes 50 on substrate 2 and corresponding counter-drive electrodes 51 on oscillating structure 3, oscillating structure 3 is excited to a torsional oscillation 10 about an axis of oscillation 11, axis of oscillation 11 essentially being aligned perpendicular to main plane of extension 100 and parallel to a Z-axis.

Moreover, sensor system 1 includes first detection elements 6 in the form of first electrodes 60 on substrate 2, and first counter electrodes 61 on oscillating structure 3, first electrodes 60 overlapping first counter electrodes 61 parallel to the Z-direction, and first capacitances 62 being produced between first electrodes 60 and corresponding first counter electrodes 61. First detection elements 6 include two pairs of first electrodes 60 and first counter electrodes 61, which are situated in mutual mirror symmetry with respect to the Y-axis and centrosymmetrically with respect to axis of oscillation 11, so that a first tilting movement 63 about the Y-axis is detected based on a first change of capacitance of the particular first capacitance 63 at both pairs of first detection means 6, first capacitance 63 increasing at one pair and decreasing at the other pair.

Analogously to first detection elements 6, the sensor system includes second detection means 7, which are configured analogously to first detection means 6 and act analogously to first detection means 6, and which furthermore are situated rotated at 90 degrees about axis of oscillation 11 relative to first detection means 6, so that second capacitances 73 are formed between second electrode 70 on substrate 2 and second counter electrodes 71 on oscillating structure 3, which, through second changes in capacitance, are provided for detecting a second tilting movement 73 of oscillating structure 3 about the X-axis or about a second tilting axis 105. Due to torsional oscillation 10, a first rate-of-rotation about the Y-axis leads to two first Coriolis forces relative to axis of oscillation 11 on one side of oscillating structure 3, which forces act parallel to second Z-axis and are anti-parallel with respect to each other, so that second tilting movement 12 is produced as a function of first rate-of-rotation, which is quantified with the aid of second detection means 7.

In an analogous manner, a second rate-of-rotation about the X-axis produces two second Coriolis forces 15, which likewise run parallel to the Z-direction and anti-parallel to each other, and which produce first tilting movement 63 about the Y-axis or about a first tilting axis 106, which is quantified by first detection means 6. Furthermore, sensor system 1 includes means 80 for measuring driven torsional oscillation 10, which means are implemented in the form of finger electrodes 81 on substrate 2 and counter-finger electrodes 82 on oscillating structure 3 engaging with finger electrodes 81. Capacitive measurement 83 of torsional oscillation 10 is used to control drive voltages 55 at drive elements 5.

In addition, sensor system 1 includes third detection means (not shown), which monitor drive voltages 55, a deviation of drive voltages 55 from a characteristic curve of drive voltages 55 being evaluated in particular, the characteristic curve having an essentially periodic characteristic due to torsional oscillation 10. Because of the mass inertia of oscillating structure 3, an angular acceleration 18 of sensor system 1 about the Z-axis superposed to torsional oscillation 10 leads to a deflection of oscillating structure 3 relative to substrate 2, about axis of oscillation 11. This deflection results in the deviation of drive voltages 55, which is detected and quantified by the third detection means. First rate-of-rotation is therefore detected by second detection means 7, second rate-of-rotation is detected by first detection means 6, and angular acceleration 18 is detected by the third detection means, so that the sensor system includes a 3-channel rate-of-rotation sensor, which is sensitive in the X-, Y- and Z-direction, simultaneously and independently of each other.

Figure 2:
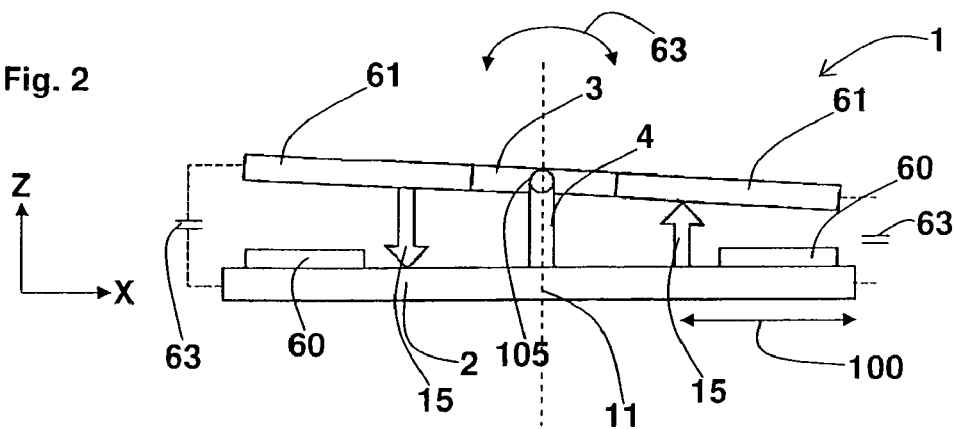
FIG. 2 shows a schematic sectional side view of a sensor system according to the exemplary embodiment of the present invention.

FIG. 2 shows a schematic sectional side view of a sensor system 1 according to the exemplary embodiment of the present invention, FIG. 2 showing a section along a sectional plane 101 illustrated in FIG. 1, which is perpendicular to the Y-axis and in which axis of oscillation 11 is running. For illustration purposes, the two first capacitances 63, 63' are schematically shown as circuit symbols in the form of two plate capacitors. Furthermore, the two second Coriolis forces 15 parallel to the Z-axis are schematically indicated by arrows, the two second Coriolis forces 15 having an anti-parallel alignment relative to each other and having as cause a second rate-of-rotation of oscillating structure 3 about the X-axis, so that oscillating structure 3 executes a first tilting movement 63 about the Y-axis relative to substrate 2. This tilting movement leads to a change in the clearances between first electrodes 60 and corresponding first counter electrodes 61, which is measurable with the aid of first detection elements 6 based on two opposite first changes in capacitance of the two first capacitances 63.

Figure 3:
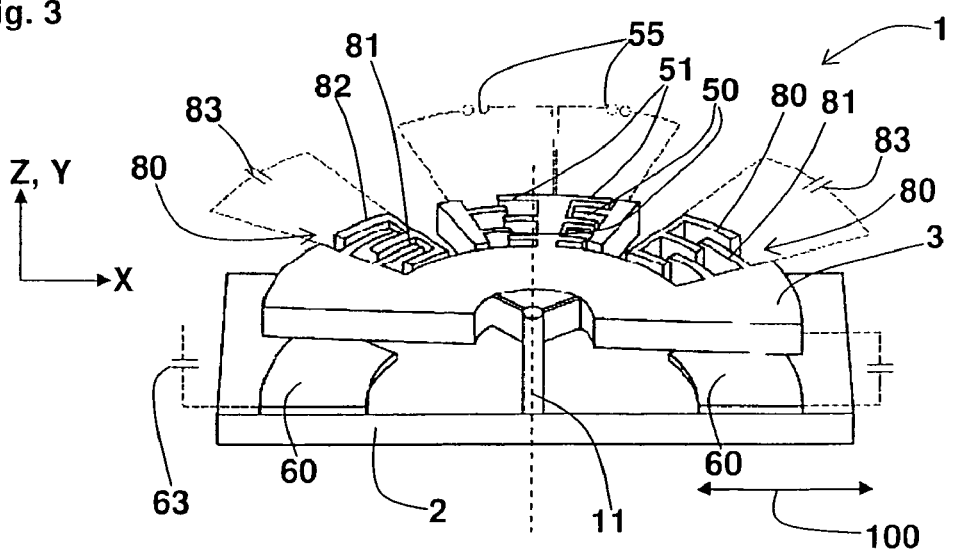
FIG. 3 shows a schematic perspective view of a sensor system according to the exemplary embodiment of the present invention.

FIG. 3 illustrates a schematic perspective view of a sensor system 1 according to the exemplary embodiment of the present invention. For illustration purposes, FIG. 3 shows drive voltages 55 between drive electrodes 50 and counter-drive electrodes 51. Illustrated in addition in FIG. 3 is capacitive measurement 83 of torsional oscillation 10 with the aid of finger electrodes 81 and counter-finger electrodes 82 engaging with finger electrodes 81.

What is claimed is:

1. A method for operating a sensor system including a substrate having a main plane of extension and an oscillating structure movable relative to the substrate, comprising:
   exciting, by drive elements, the oscillating structure to a torsional oscillation about an axis of oscillation extending substantially perpendicular to the main plane of extension; and
   detecting, with the aid of first detection elements, a first tilting movement of the oscillating structure about a first tilting axis extending substantially parallel to the main plane of extension; and
   detecting, with the aid of further detection elements, an angular acceleration of the substrate superposed to the torsional oscillation substantially about the axis of oscillation.

2. The method as recited in claim 1, wherein a change in capacitance between a detection electrode on the substrate and a counter-detection electrode on the oscillating structure is detected with the aid of the further detection elements.

3. The method as recited in claim 2, wherein the torsional oscillation is generated capacitively with the aid of the drive elements, and wherein the drive elements include drive electrodes on the substrate and corresponding counter-drive electrodes on the oscillating structure, and wherein drive voltages are applied between the drive electrodes and the counter-drive electrodes.

4. The method as recited in claim 3, wherein the drive voltages are evaluated with the aid of the further detection elements.

5. The method as recited in claim 2, wherein the first tilting movement is capacitively detected with the aid of the first detection elements, and wherein the first detection elements include first electrodes on the substrate and corresponding first counter electrodes on the oscillating structure, and wherein a first change in capacitance between one of the first electrodes and one of the first counter electrodes is detected.

6. The method as recited in claim 2, further comprising:
   detecting, with the aid of second further detection elements, a second tilting movement of the oscillating structure about a second tilting axis extending substantially parallel to the main plane of extension and substantially perpendicular to the first tilting axis, and wherein the second further detection elements include second electrodes on the substrate and corresponding second counter electrodes on the oscillating structure, and wherein a second change in capacitance between one of the second electrodes and one of the second counter electrodes is detected.

7. A sensor system, comprising:
a substrate having a main plane of extension;
an oscillating structure configured to be movable relative to the substrate;
drive elements for generating a torsional oscillation of the oscillating structure about an axis of oscillation extending substantially perpendicular to the main plane of extension;
first detection elements for detecting a first tilting movement of the oscillating structure about a first tilting axis extending substantially parallel to the main plane of extension; and
further detection elements for detecting an angular acceleration of the oscillating structure superposed to the torsional oscillation substantially about the axis of oscillation.

8. The sensor system as recited in claim 7, wherein the drive elements include drive electrodes on the substrate and corresponding counter-drive electrodes on the oscillating structure, and wherein the further detection elements are configured to evaluate drive voltages between the drive electrodes and the counter-drive electrodes.

9. The sensor system as recited in claim 8, wherein the further detection elements include detection electrodes on the substrate and corresponding counter-detection electrodes on the oscillating structure.

10. The sensor system as recited in claim 9, further comprising:
second further detection elements configured to detect a second tilting movement of the oscillating structure about a second tilting axis extending substantially parallel to the main plane of extension and substantially perpendicular to the first tilting axis.

* * * * *